(12) United States Patent
Franklin et al.

(10) Patent No.: US 7,845,069 B2
(45) Date of Patent: Dec. 7, 2010

(54) METHODS FOR FORMING ARMORED CABLE ASSEMBLY

(75) Inventors: Robert Brian Franklin, Taylorsville, NC (US); Jimmy Dameron, Hickory, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 164 days.

(21) Appl. No.: 11/948,440

(22) Filed: Nov. 30, 2007

(65) Prior Publication Data

US 2009/0139084 A1 Jun. 4, 2009

(51) Int. Cl.
*H01B 13/20* (2006.01)

(52) U.S. Cl. .......................... 29/825; 29/828; 385/103; 385/107

(58) Field of Classification Search ................ 29/825, 29/828; 385/103, 107
See application file for complete search history.

(56) References Cited

U.S. PATENT DOCUMENTS

| | | | | |
|---|---|---|---|---|
| 4,902,097 A | * | 2/1990 | Worthington et al. | 385/103 |
| 5,126,167 A | * | 6/1992 | Matsuno et al. | 427/163.2 |
| 6,870,994 B2 | * | 3/2005 | Kobayashi et al. | 385/102 |
| 6,906,264 B1 | | 6/2005 | Grant, Jr. et al. | |
| 7,016,576 B2 | * | 3/2006 | Cocchini et al. | 385/104 |
| 7,092,605 B2 | | 8/2006 | Adams et al. | |
| 7,266,886 B2 | * | 9/2007 | Estienne et al. | 29/828 |
| 2004/0081412 A1 | * | 4/2004 | Cocchini et al. | 385/104 |
| 2005/0098342 A1 | * | 5/2005 | Sakabe et al. | 174/102 R |
| 2005/0268458 A1 | | 12/2005 | Ledbetter | |

OTHER PUBLICATIONS

Roteq, "Strip Armouring 125mm/5.0in BX Machine", 2 pages.

* cited by examiner

*Primary Examiner*—C. J Arbes
(74) *Attorney, Agent, or Firm*—Myers Bigel Sibley & Sajovec

(57) ABSTRACT

A method for forming an armored cable assembly includes: forming an armor sheath using an armor sheath forming apparatus, the armor sheath defining a sheath passage; forcibly feeding a transmission cable into the sheath passage upstream of an exit capstan to provide an excess length of the transmission cable in the armor sheath upstream of the exit capstan; and drawing the armor sheath downstream of the armor sheath forming apparatus using the exit capstan.

15 Claims, 7 Drawing Sheets

METHODS FOR FORMING ARMORED CABLE ASSEMBLY

FIELD OF THE INVENTION

The present invention relates to cables and methods and apparatus for forming cables and, more particularly, to armored cables and methods and apparatus for forming armored cables.

BACKGROUND OF THE INVENTION

Armored cable is a type of cable including an inner transmission media or cable (e.g., a fiber optic cable) circumferentially surrounded by an outer armor sheath. Armored cable is often used in applications in which mechanical protection of the transmission media is necessary or desirable. For example, armored cable may be used for enterprise or structured wiring where the cable may be exposed to substantial stresses during or after installation. Armored cable is commonly fabricated by helically winding a metal strip circumferentially about a cable.

SUMMARY OF THE INVENTION

According to embodiments of the present invention, a method for forming an armored cable assembly includes: forming an armor sheath using an armor sheath forming apparatus, the armor sheath defining a sheath passage; forcibly feeding a transmission cable into the sheath passage upstream of an exit capstan to provide an excess length of the transmission cable in the armor sheath upstream of the exit capstan and drawing the armor sheath downstream of the armor sheath forming apparatus using the exit capstan.

According to some embodiments, the method includes drawing the armor sheath onto the exit capstan at a first rate and forcibly feeding the transmission cable to the exit capstan at a second rate at least as great as the first rate. According to some embodiments, the second rate is greater than the first rate.

According to embodiments of the present invention, an apparatus for forming an armored cable assembly includes an armor sheath forming apparatus to form an armor sheath, the armor sheath defining a sheath passage. An exit capstan is provided downstream of the armor sheath forming apparatus to draw the armor sheath downstream of the sheath forming apparatus. A driven feed capstan is located upstream of a location where the armor sheath is formed to forcibly feed a transmission cable into the sheath passage upstream of the exit capstan to provide an excess length of the transmission cable in the armor sheath upstream of the exit capstan.

According to some embodiments, the apparatus for forming an armored cable assembly includes a controller configured to draw the armor sheath onto the exit capstan at a first rate and forcibly feed the transmission cable to the exit capstan at a second rate at least as great as the first rate. According to some embodiments, the second rate is greater than the first rate.

According to further embodiments of the present invention, an armored cable assembly includes an armor sheath and a transmission cable. The armor sheath defines a sheath passage. The transmission cable extends through the sheath passage and is circumferentially surrounded by the armor sheath. The transmission cable has an excess cable length in the armor sheath such that a ratio of the length of the transmission cable in the sheath passage per unit length of the armor sheath is at least 1.0.

According to some embodiments, the transmission cable is a fiber optic cable. According to some embodiments, the armor sheath includes a strip that is helically wound to form a series of interlocking segments.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
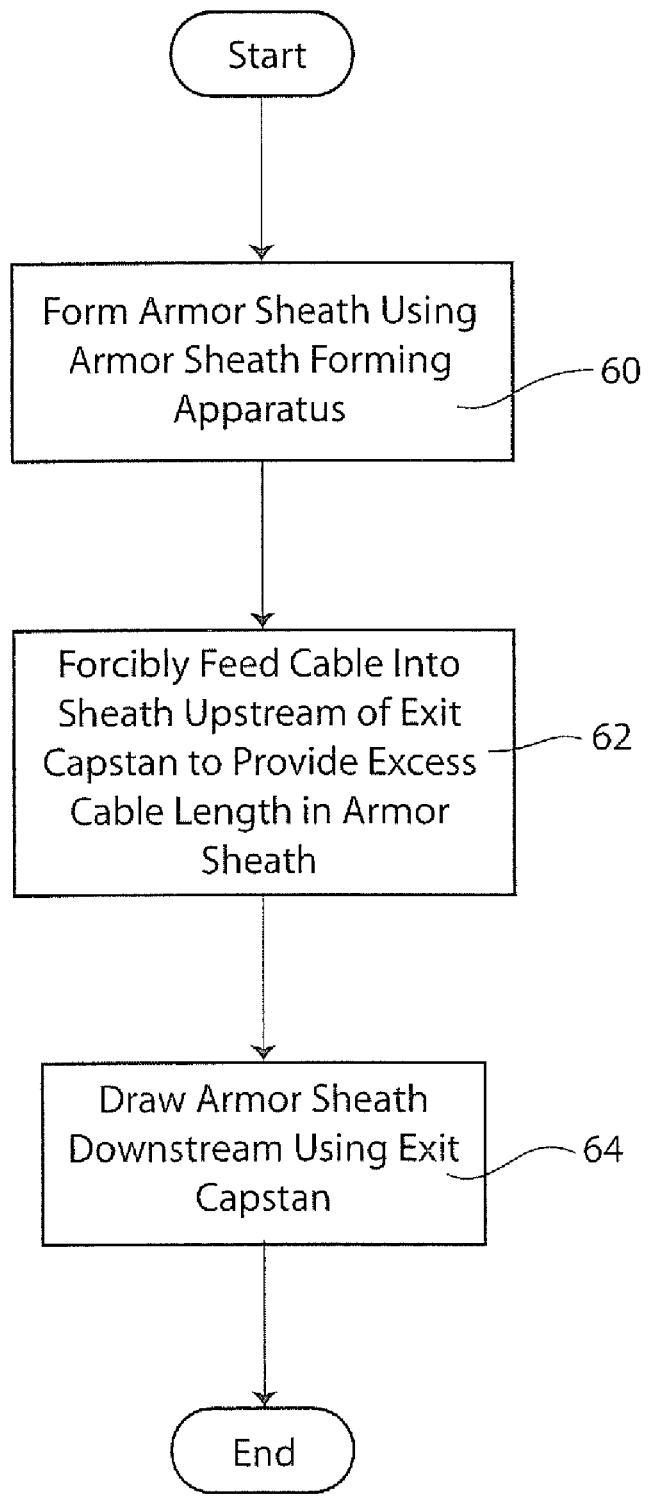
FIG. 1 is a block diagram representing methods for forming armored cable in accordance with embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Methods and apparatus of the present invention may be used to form armored cable assemblies, such as armored optical fiber cable, with reduced defects, and/or improved performance and integrity.

In accordance with embodiments of the present invention and with reference to the flow chart of FIG. 1, an armored cable assembly may be formed as follows. An armor sheath is formed using an armor sheath forming apparatus (Block 60). The armor sheath defines a sheath passage. A transmission cable is forcibly fed into the sheath passage upstream of an exit capstan to provide an excess length of the transmission cable in the armor sheath upstream of the exit capstan (Block 62). The armor sheath is drawn downstream of the armor sheath forming apparatus using the exit capstan (Block 64). According to some embodiments, the formation of the armor sheath, the drawing of the armor sheath, and the forcible feeding of the transmission cable are simultaneously executed in a continuous process.

Figure 2:
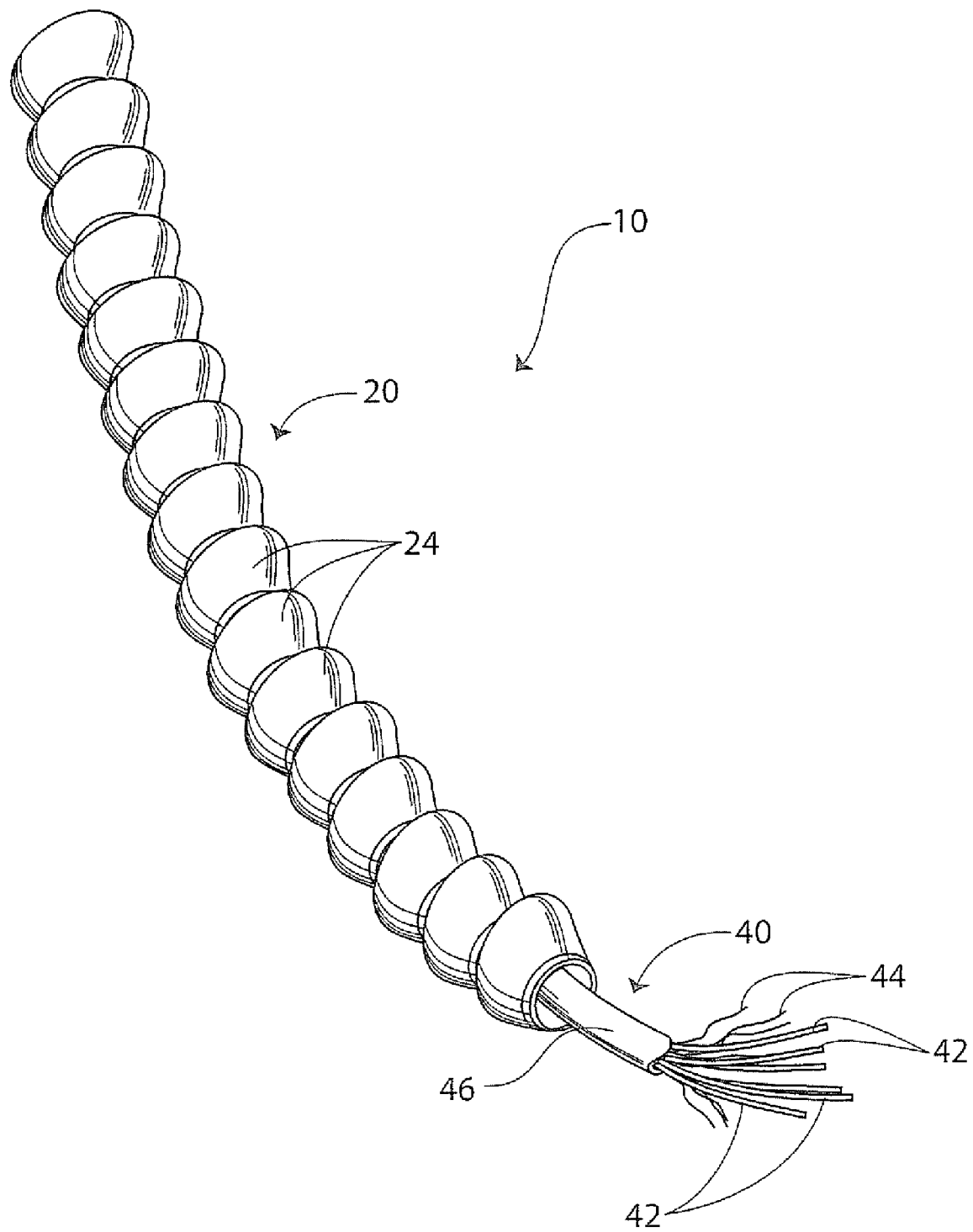
FIG. 2 is a perspective view of an armored cable assembly according to embodiments of the present invention.
Figure 3:
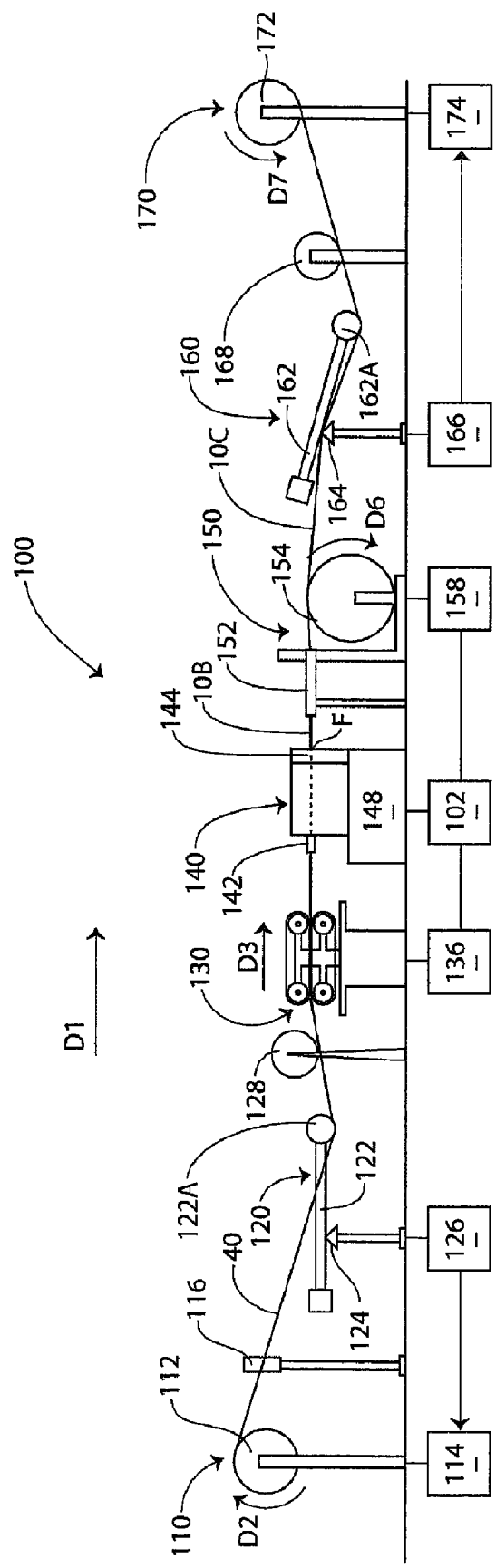
FIG. 3 is a schematic view of an assembly line for forming the armored cable assembly of FIG. 2 according to embodiments of the present invention.

With reference to FIG. 2, an armored cable assembly 10 according to embodiments of the present invention is shown therein. The armored cable assembly 10 includes an armor sheath 20 defining a sheath passage 22 (FIG. 9A) and a fiber optic cable 40 extending through the passage 22. According to some embodiments, the armor sheath 20 fully circumferentially surrounds the cable 40.

The armor sheath 20 includes a continuous elongated strip that is helically wound such that each convolution of the strip interlocks with its adjacent (i.e., leading and trailing) convolutions. That is, the strip forms a plurality of seriated and imbricated segments 24. Each segment 24 includes an outer lip 26 and an inner lip 30. As shown for example in FIG. 9A, the lips 26, 30 of adjacent segments 24 interlock with one another. The armor sheath 20 defines a series of alternating crowns 28 and valleys 32. The interlocked segments 24 may permit a limited range of articulation or bending of the armor sheath 20 to facilitate manufacture, handling and installation of the armored cable assembly 10 while also preventing sharp bends in the fiber optic cable 40. According to some embodiments, the armor sheath 20 is formed of metal. According to some embodiments, the armor sheath 20 is formed of aluminum or steel.

The fiber optic cable 40 includes generally one or more optical fibers 42, one or more strength members or yarns 44, and a protective outer jacket 46. According to some embodiments and as illustrated, the cable 100 is round in cross-section and the foregoing groups of components are substantially concentrically positioned about and extend together along a lengthwise axis. These components will be described in more detail below.

As shown, the cable 40 includes a bundle of six (6) optical fibers 42. According to some embodiments, the optical fibers 42 are loose with respect to one another so that they have no particular, fixed relative orientation. According to some embodiments, each optical fiber 42 includes a glass fiber, which includes a glass core and a surrounding glass cladding. The glass fiber may be constructed in any suitable manner. For example, each of the core and the cladding may include one or more concentric segments or layers, may be doped, etc. The glass fiber may be formed of any suitable materials and using any suitable methods. A coating layer may surround the cladding. The coating layer may provide environmental protection for the glass fiber. According to some embodiments, the coating layer is formed of a UV light-cured acrylate. The coating layers of the respective optical fibers 110 may have different colors for color-coding purposes. The optical fibers 42 may be buffered (e.g., tight buffered) or non-buffered. According to some embodiments, the overall diameter of each optical fiber 42 is in the range of from about 250 to 900 μm.

As shown, the cable 40 further includes a bundle of the strength yarns 44 at least partially surrounding the optical fiber bundle. The strength yarns 44 may be formed of any suitable material. According to some embodiments, the strength yarns 44 are aramid fibers. Other suitable materials may include fiberglass or polyester.

The jacket 46 surrounds the yarn bundle and the optical fiber bundle, which reside in a longitudinal passage defined in the jacket 46. The jacket 46 may be formed of any suitable material such as a polymeric material. According to some embodiments, the jacket 46 is formed of a thermoplastic polymer. Suitable polymeric materials may include PVC, PVDF, or FRPE. The jacket 46 may be molded or extruded over the fiber bundle and the strength yarn bundle. According to some embodiments, the thickness of the jacket 46 is between about 0.25 and 2.25 mm.

Suitable apparatus and methods for forming the cable 40 will be apparent to those of skill in the art. The optical fiber bundle and the strength yarn bundle may be stranded together and the jacket 46 then molded or extruded thereover. The optical fibers 42 may be helically stranded (e.g., using a reverse oscillating or S-Z technique). The cable 40 may then be wound onto a roll. The cable 40 is thus premanufactured as illustrated.

With reference to FIGS. 3-6, an assembly line apparatus 100 according to the embodiments of the present invention is shown therein and may be used to form armored cable (e.g., the armored cable assembly 10) has discussed herein. The assembly line 100 includes generally and in series: a controller 102 (FIG. 3); a payoff apparatus 110; an idler roller 116; a feed tensioner 120; an idler roller 128; a cable feed apparatus 130; an armor sheath forming apparatus 140; an exit capstan apparatus 150; a take-up tensioner 160, an idler roller 168; and a take-up apparatus 170. The assembly line 100 may enable a continuous, sequential process proceeding from the payoff apparatus 110 to the take-up apparatus 170 in a flow-path direction D1. The cable 40 engages and passes through, over or under each of the apparatus 110, 116, 120, 128, 130, 140, 150, 160, 168, 170.

The payoff apparatus 110 includes a reel 112 and a motor 114 operable to drive the reel 112 in a rotational direction D2. A supply of the cable 40 is pre-wound on the reel 112 in known manner, for example.

The feed tensioner 120 includes a dancer 122 having an engagement roller 122A on one end thereof. The dancer 122 is pivotally mounted on a fulcrum 124. The cable 40 is routed from the reel 112, over the idler roller 116, and under the roller 122A such the dancer 122 supports the cable 40. A sensor 126 is operably connected to the dancer 122 to measure a tension on the cable 40. The sensor 126 communicates with the motor 114 to control the rate of payoff from the payoff apparatus 110 to maintain the tension of the cable 40 in a desired range.

Figure 4:
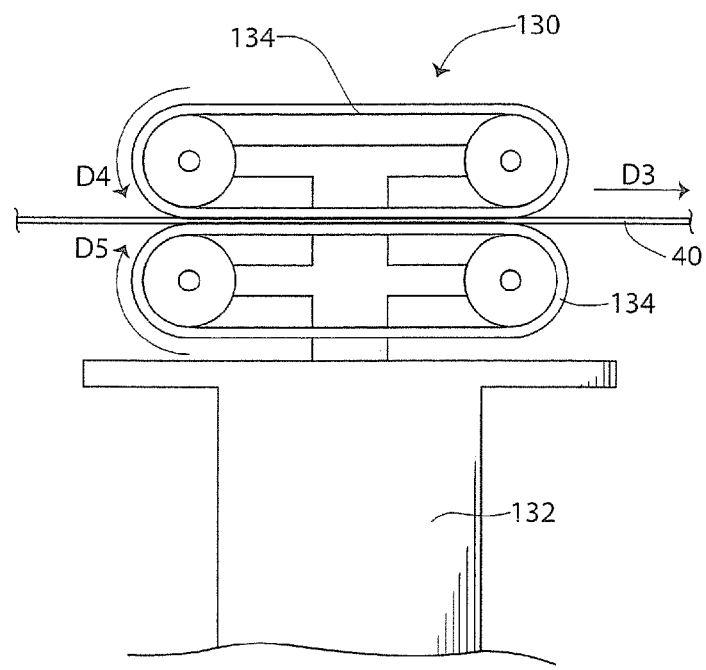
FIG. 4 is a side view of a cable feed apparatus forming a part of the assembly line of FIG. 3.

The cable 40 is further routed from the tensioner apparatus 120 to the cable feed apparatus 130 (FIG. 4). According to some embodiments and as illustrated, the cable feed apparatus 130 is a driven capstan. The cable feed apparatus 130 includes a stand 132 and a pair of opposed conveyor belts 134 mounted on the stand 132. A motor 136 is operable to drive the conveyor belts 134 in opposed rotational directions D4, D5. The motor 136 may be controlled by the controller 102. In use, the cable 40 is routed through the cable feed apparatus 130 such that the conveyor belts 134 sandwich and engage the cable 40 and, by rotating in the directions D4, D5, drive the cable 40 in a downstream direction D3. The conveyor belts 134 may be mounted on driven rollers, for example. Other mechanisms may be used to engage and forcibly drive the cable 40, such as opposed driven rollers.

According to some embodiments, the cable feed apparatus 130 is replaced with a single wheel capstan (e.g., similar to the exit capstan 150) that the cable 40 wraps around to enable sufficient contact between the cable and the capstan to forcibly feed the cable 40. This embodiment may be beneficial because the capstan will engage all components in the cable 40 whereas the belts 134 may put tension on the jacket 46 only and stretch the jacket 46.

Figure 5:
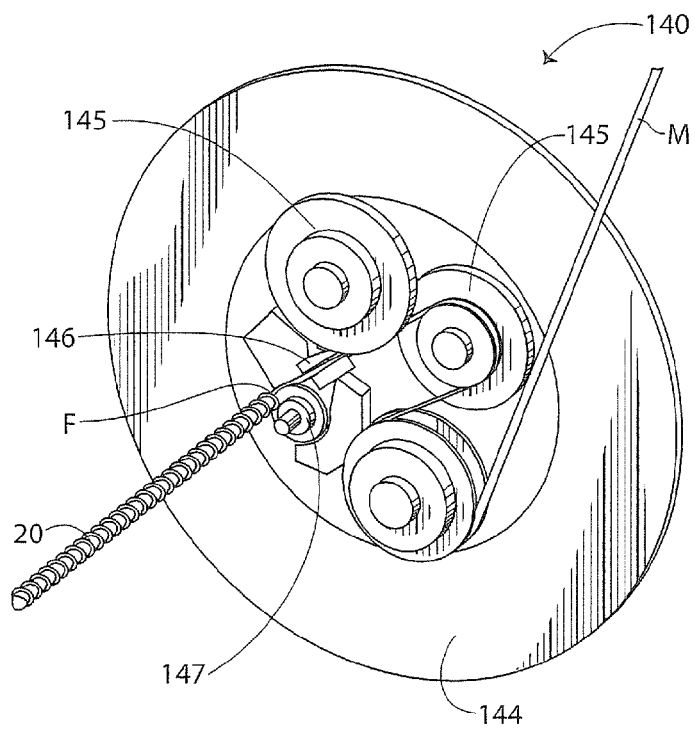
FIG. 5 is a perspective view of an armor sheath forming apparatus forming a part of the assembly line of FIG. 3.
Figure 6:
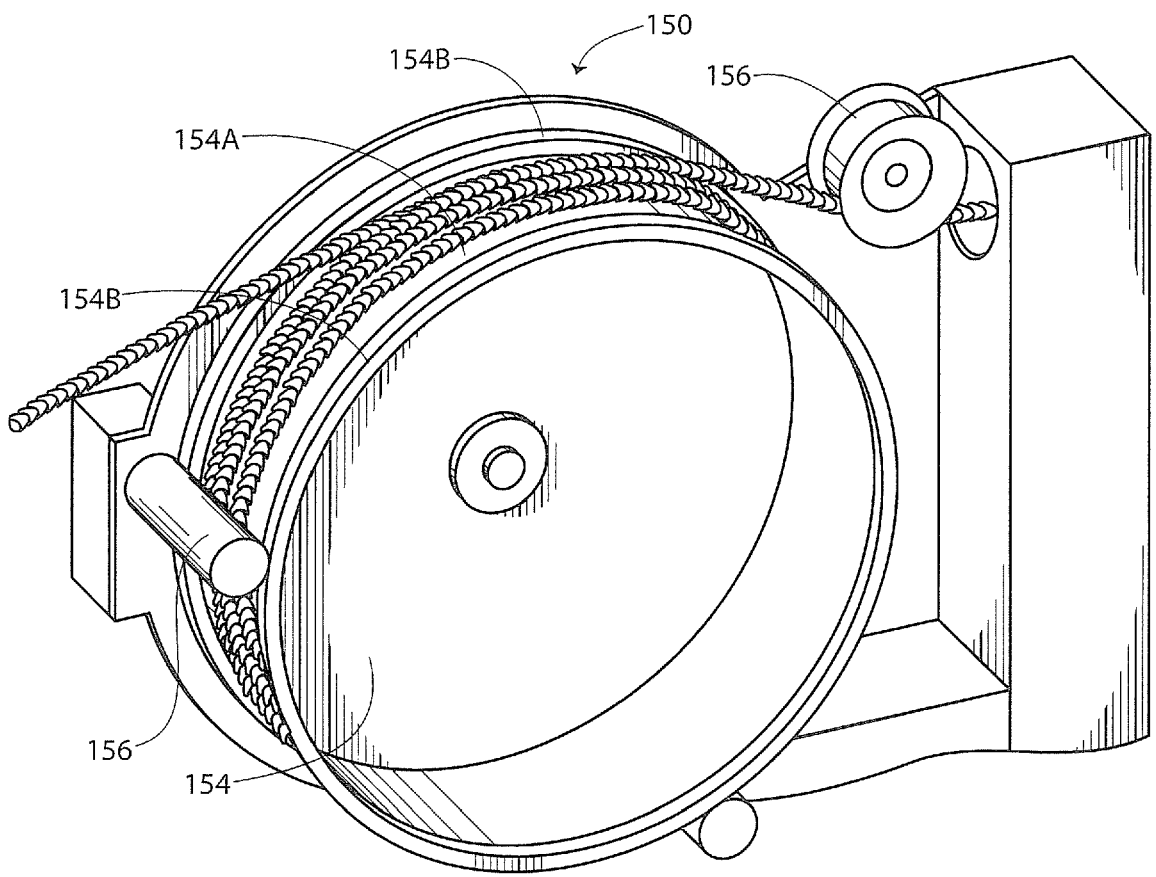
FIG. 6 is a perspective view of an exit capstan apparatus forming a part of the assembly line of FIG. 3.

The cable 40 is thereafter routed downstream to the armor sheath forming apparatus 140 (FIG. 5). The armor sheath forming apparatus 140 may be any suitable device for forming the armor sheath 20. According to some embodiments, the armor sheath forming apparatus 140 is a strip or roll armoring apparatus. In the illustrated embodiments, the armor sheath forming apparatus 140 includes an inlet (as illustrated, in the form of an inlet tube at 142), a flywheel 144, strip guide rollers 145, a forming die 146, a forming roller 147, and a motor 148. The cable 40 is routed into the armor sheath forming apparatus 140 through the inlet tube 142. An elongated metal web or strip M is routed about the guide rollers 145 and to the forming die 146 and forming roller 147. The motor 148 may be controlled by the controller 102. The motor 148 drives the flywheel 144. Rotation of the flywheel 144 causes the forming die 146 and the forming roller 147 to rotate with respect to the strip M and the cable 40 such that the forming die 146 and the forming roller 147 helically wind and deform the strip M into the armor sheath 20 at an armor forming location F. Suitable strip or roll armoring apparatus may include equipment available from Roteq Machinery, Inc. of Ontario, Canada. The cable 40 is routed out of the armor sheath forming apparatus 140 through the forming location F such that the armor sheath 20 is originally formed circumferentially about the cable 40 at the forming location F.

The exit capstan apparatus 150 (FIG. 6) includes a guide 152, a capstan wheel 154, idler rollers 156, and a motor 158. The capstan wheel 154 has a peripheral circumferential surface 154A and opposed peripheral side flanges 154B. The motor 158 is operable to drive the capstan wheel 154 in a rotational direction D6. The motor 158 may be controlled by the controller 102. The cable 40 and the armor sheath 20 are routed from the forming location F, through the guide tube 152, circumferentially around the capstan wheel 154, and then further downstream. According to some embodiments, the cable 40 and the armor sheath 20 are wrapped around the capstan wheel 154 at least one full revolution (i.e., at least 360°), and according to some embodiments, a plurality of revolutions.

The take-up tensioner 160 includes a dancer 162 having an engagement roller 162A on one end thereof. The dancer 162 is pivotally mounted on a fulcrum 164. The cable 40 and the armor sheath 20 are routed from the capstan wheel 154, under the roller 162A such the dancer 122 supports the cable 40 and the armor sheath 20, over the idler roller 168, and to the take-up apparatus 160. A sensor 166 is operably connected to the dancer 162 to measure a tension on the armor sheath 20.

The take-up apparatus 170 includes a reel 172 and a motor 174 operable to drive the reel 172 in a rotational direction D7 to wind the armored cable 10 onto the reel 172. The sensor 166 communicates with the motor 174 to control the rate of take-up onto the take-up apparatus 170 to maintain the tension of the armor sheath 20 in a desired range.

In summary, in use, the cable 40 is paid off from the reel 112 and routed through the armor forming location F, where the armor sheath 20 is formed about the cable 40. The combined cable 40 and armor sheath 20 are then drawn downstream by the exit capstan apparatus 150 and onto the reel 172. During this process, the tension in the cable 40 between the reel 112 and the cable feed apparatus 130 is controlled by the sensor 126 and the pay off motor 114, and the tension in the armor sheath 20 between the reel 172 and the exit capstan apparatus 150 is controlled by the sensor 166 and the take-up motor 174.

Figure 10:
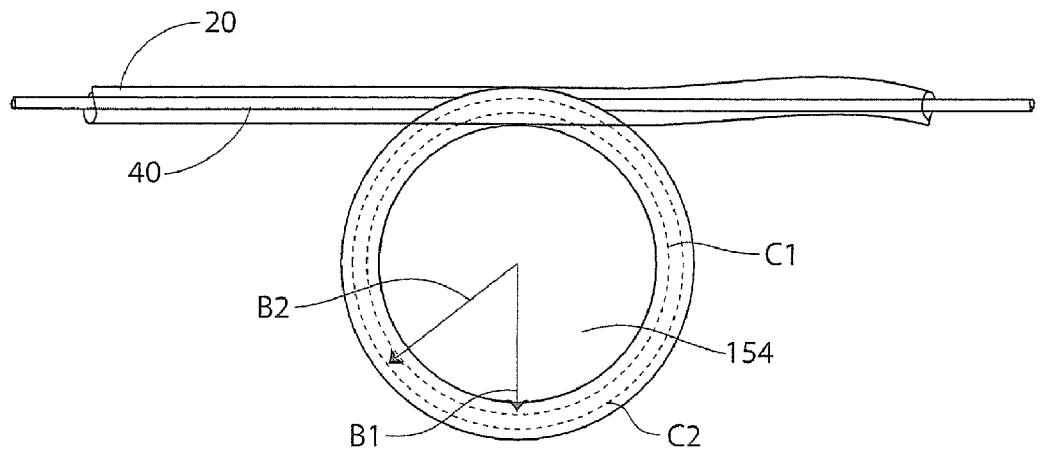
FIG. 10 is a schematic view of an armor sheath, a transmission cable and an exit capstan according to methods of the prior art to illustrate problems associated therewith.

As is known in the art, the exit capstan apparatus 150 may serve to interlock the segments of the armor sheath 20. The exit capstan apparatus 150 may also advantageously serve to maintain a uniform and/or controllably matched rate of take up of the armor sheath 20 from the armor sheath forming apparatus 140. However, in known processes for forming armored cable wherein an armor sheath is formed about a cable and the cable and armor sheath are drawn downstream about a driven capstan (such as the capstan wheel 154), the ultimate cable assembly may not perform as desired or may be defective. In particular, and as illustrated in FIG. 10, as the cable wraps around the exit capstan wheel 154, the cable lays to the inner wall of the armor sheath 20 (the cable center line is indicated at C1 and the armor sheath centerline is indicated at C2). This positioning creates a smaller centerline radius B1 for the cable than the centerline radius B2 for the armor sheath 20. As a result, the armor sheath 20 is drawn and forwarded by the exit capstan wheel 154 at a greater rate than the cable 40. When the armored cable assembly is ultimate straightened and tension is applied thereto (e.g., during installation), the full strain or tension load may be applied to the cable rather than to the armor sheath 20 because the cable 40 is effectively shorter than the armor sheath 20. This effect is undesirable because the optical fibers of the cable may be subjected to damaging tension loading and it is desirable to have the armor sheath provide strain relief for the cable assembly.

In accordance with embodiments of the present invention, the foregoing problem can be eliminated or reduced. According to some embodiments, armored cable assemblies having improved performance aspects can be manufactured. In accordance with embodiments of the present invention, the in-line cable feed apparatus 130 is controlled to forcibly feed the cable into the armor forming location F to provide an excess length of the transmission cable 40 in the armor sheath 20 upstream of the exit capstan wheel 154. More particularly, the cable feed apparatus 130 forces the cable 40 downstream at a cable feed rate RC (i.e., unit length/unit time), the armor sheath forming apparatus 140 simultaneously forms the armor sheath 20 at an armor feed rate RA, and the exit capstan apparatus 150 simultaneously takes the armor sheath 20 up on the capstan wheel 154 at a capstan draw rate RD. The relative feed and draw rates RC, RA, RD can be controlled by the controller 102 via the motors 136, 148, 158.

According to some embodiments, the cable feed rate RC is at least as great as the armor feed rate RA. According to some embodiments, the cable feed rate RC is greater than the armor feed rate RA. According to some embodiments, the cable feed rate RC is at least 1.0 percent greater than the armor feed rate RA and, according to some embodiments, at least 1.1 percent greater than the armor feed rate RA. According to some embodiments, the cable feed rate RC is between about 1.0 and 1.5 percent greater than the armor feed rate RA. According to some embodiments, the capstan draw rate RD is substantially the same as the armor feed rate RA.

The effect of the forcible overfeeding of the cable 40 as described above will now be illustrated with reference to FIGS. 7-9B and 11. In the illustrated example, the cable feed rate RC is greater than the armor feed rate RA, and the capstan draw rate RD is substantially the same as the armor feed rate RA.

Figure 7:
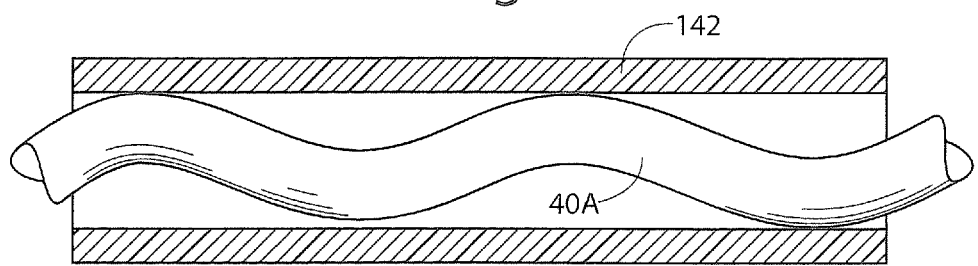
FIG. 7 is an enlarged, fragmentary, cross-sectional view of an inlet tube of the armor sheath forming apparatus and a section of cable extending therethrough.

FIG. 7 shows a section of the inlet tube 142 (which is between the cable feed apparatus 130 and the armor forming location F) and a section 40A of the cable 40 disposed therein. The cable section 40A undulates within the inlet tube 142 because the cable 40 has been overfed. The cable section 40A is thereby buckled and the excess length is radially distributed within the inlet tube 142.

Figure 8A:
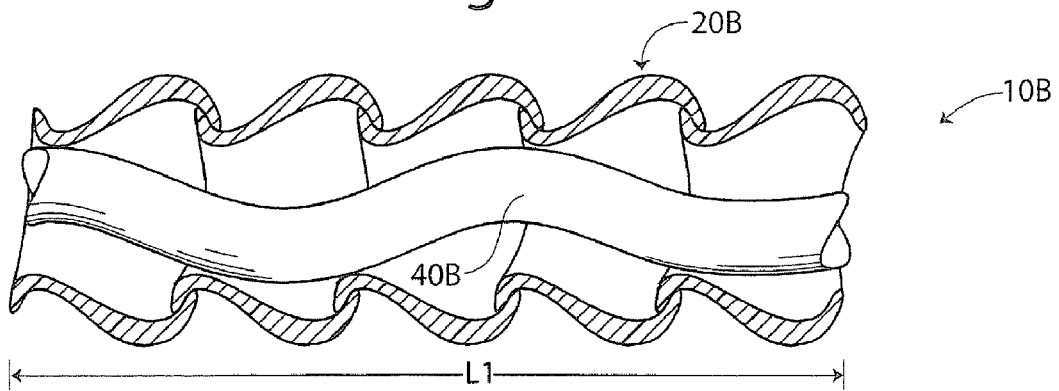
FIG. 8A is an enlarged, fragmentary, cross-sectional view of a first armored cable assembly section.
Figure 8B:
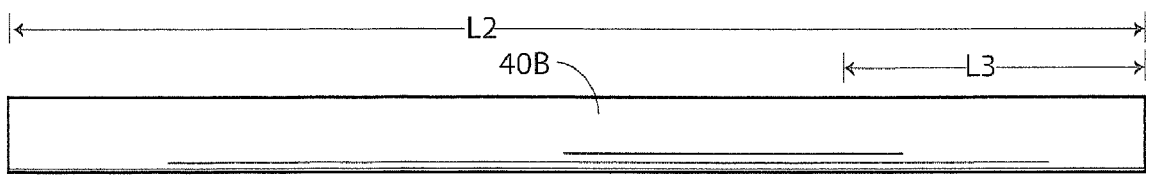
FIG. 8B is an enlarged view of a first cable section of the first armored cable assembly section of FIG. 8A extending in a straight position to illustrate the length of the first cable section.

FIG. 8A shows an armored cable assembly section 10B between the armor forming location F and the exit capstan apparatus 150. The armored cable assembly section 10B includes an armor section 20B of the armor sheath 20 and a cable section 40B of the cable 40 disposed therein. The cable section 40B undulates within the armor section 20B because the cable 40 has been overfed. The cable section 40B is thereby buckled and the excess length is radially distributed within the armor sheath section 20B. FIG. 8B is a view of the cable section 40B pulled straight to show the excess linear cable length L3 (i.e., the difference between the armor section 20B length L1 and the cable section 40B length L2).

Figure 9A:
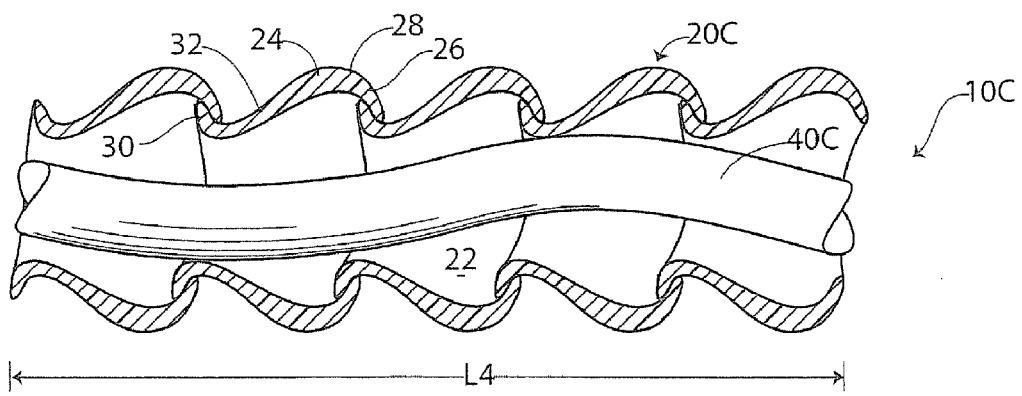
FIG. 9A is an enlarged, fragmentary, cross-sectional view of a second armored cable assembly section.
Figure 9B:
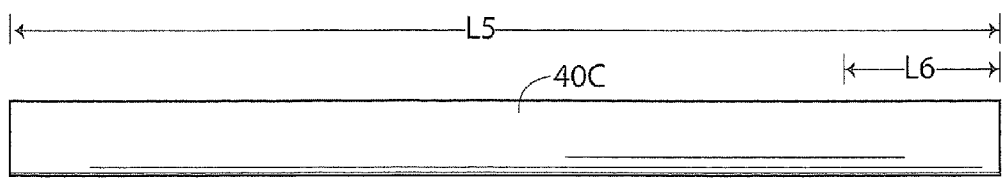
FIG. 9B is an enlarged view of a second cable section of the second armored cable assembly section of FIG. 9A extending in a straight position to illustrate the length of the second cable section.

FIG. 9A shows an armored cable assembly section 10C downstream of the exit capstan apparatus 150, which may also be regarded as a section of the final armored cable assembly 10. The armored cable assembly section 10C includes an armor section 20C of the armor sheath 20 and a cable section 40C of the cable 40 disposed therein. The cable section 40C undulates within the armor section 20C because the cable 40 has been overfed, providing an excess cable length in the armor sheath 20. The cable section 40C is thereby buckled and the excess cable length is radially distributed within the armor sheath section 20C. However, the amount of excess cable length is less than in the armored cable assembly section 10B because a portion of the excess cable length has been consumed by the centerline differential described above. FIG. 9B is a view of the cable section 40C pulled straight to show the excess linear cable length L6 (i.e., the difference between the armor section 20C length L4 and the cable section 40C length L5).

According to some embodiments, the ratio of the length L2 (FIG. 8B) to the length L1 (FIG. 8A) (i.e., the cable length per unit length of the armor sheath) is at least about 1.2. According to some embodiments, the ratio of the length L2 (FIG. 8B) to the length L1 (FIG. 8A) is between about 1.2 and 1.5.

According to some embodiments, the ratio of the length L5 (FIG. 9B) to the length L4 (FIG. 9A) (i.e., the cable length per unit length of the armor sheath in the finished armored cable assembly) is at least about 1.0. According to some embodiments, the ratio of the length L5 (FIG. 9B) to the length L4 (FIG. 9A) is between about 1.0 and 1.1.

Figure 11:
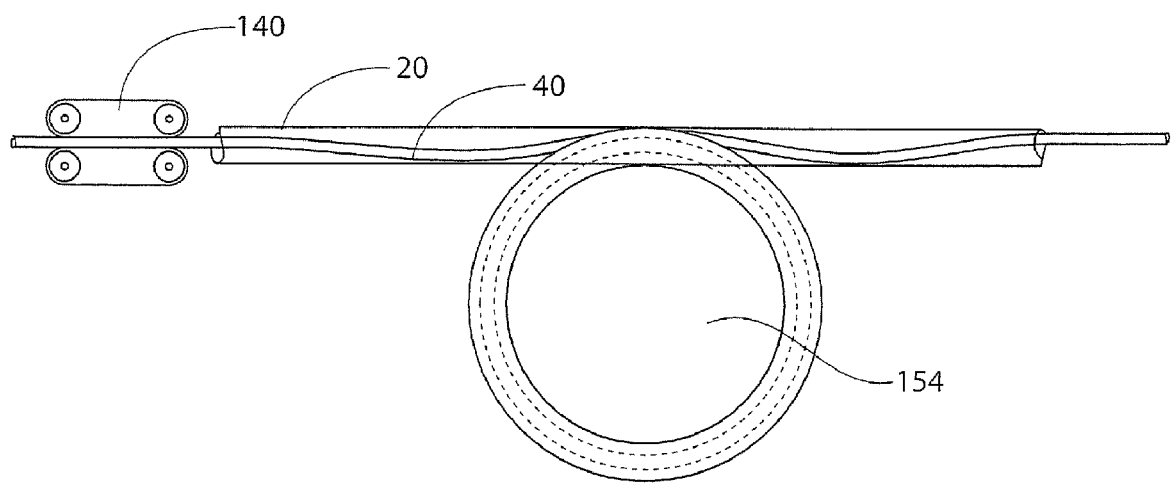
FIG. 11 is a schematic view of the armor sheath, the transmission cable and the exit capstan according to embodiments of the present invention to illustrate advantages thereof.

The impact and effect of the overfeeding of the cable 40 may be further appreciated by reference to FIG. 11. As schematically depicted therein, the excess cable length fed to the exit capstan wheel 154 offsets the centerline differential effect to provide, in the finished armored cable assembly 10, a linear length of cable 40 that is as great as or greater than the linear length of armor sheath 20 per unit length of the armored cable assembly 10.

Methods and apparatus according to the present invention may provide particular advantages. The functionality and advantages of the exit capstan apparatus can be retained. For example, the exit capstan apparatus 150 can be used to interlock the armor sheath 20 and to provide a uniform and controlled rate of take up from the armor sheath forming apparatus 140. Additionally, the deleterious effects previously associated with the exit capstan apparatus can be reduced or altogether eliminated by providing excess cable length to the exit capstan apparatus. In particular, the methods and apparatus of the present invention can reduce or eliminate the tendency in the formed armored cable assembly to have a greater length of the armor sheath than of the inner transmission cable. According to some embodiments, the length of the transmission cable is at least as great as the length of the armor sheath in the finished cable assembly so that, in use, the transmission cable does not tend to disproportionately bear strain. According to some embodiments, the cable is overfed such that, in the finished armor cable assembly, the length of the cable is greater than the length of the surrounding armor sheath (i.e., the cable is buckled or undulating within the armor sheath). In this case, the armor sheath may tend to bear substantially all or an increased or disproportionate share of the cable assembly strain during installation or use of the armored cable assembly.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for forming an armored cable assembly, the method comprising:
    forming an armor sheath using an armor sheath forming apparatus, the armor sheath defining a sheath passage;
    forcibly feeding a transmission cable into the sheath passage upstream of an exit capstan to provide an excess length of the transmission cable in the armor sheath upstream of the exit capstan; and
    drawing the armor sheath downstream of the armor sheath forming apparatus using the exit capstan.

2. The method of claim 1 including drawing the armor sheath onto the exit capstan at a first rate and forcibly feeding the transmission cable to the exit capstan at a second rate at least as great as the first rate.

3. The method of claim 2 wherein the second rate is greater than the first rate.

4. The method of claim 3 wherein the second rate is at least 1.0 percent greater than the first rate.

5. The method of claim 1 wherein forcibly feeding a transmission cable includes forcibly feeding the transmission cable into the sheath passage using a driven feed capstan upstream of a location where the armor sheath is formed.

6. The method of claim 5 wherein the driven feed capstan includes a pair of opposed rollers configured to engage and convey the transmission cable.

7. The method of claim 1 wherein forming the armor sheath includes helically winding and interlocking a strip about the transmission cable at the location where the armor sheath is formed.

8. The method of claim 7 wherein the transmission cable includes at least one optical fiber.

9. The method of claim 8 wherein the transmission cable includes a jacket surrounding the at least one optical fiber.

10. The method of claim 1 wherein the formed armor cable assembly downstream of the exit capstan has an excess length of the transmission cable in the armor sheath.

11. The method of claim 10 wherein the transmission cable in the formed armor cable assembly downstream of the exit capstan undulates within the sheath passage.

12. The method of claim 1 wherein a ratio of the length of the transmission cable in the sheath passage per unit length of the armor sheath in the formed armor cable assembly downstream of the exit capstan is between about 1:1 and 1.1:1.

13. The method of claim 1 wherein the exit capstan includes a capstan wheel, and the armor sheath is wrapped around the capstan wheel at least one full revolution.

14. The method of claim 13 wherein the armor sheath is wrapped around the capstan wheel a plurality of revolutions.

15. The method of claim 1 wherein the transmission cable includes at least one optical fiber.

* * * * *